United States Patent
Minaguchi et al.

(10) Patent No.: US 8,737,049 B2
(45) Date of Patent: May 27, 2014

(54) ELECTRONIC APPARATUS

(75) Inventors: Hiroyuki Minaguchi, Higashimatsuyama (JP); Naohiro Yokoyama, Akishima (JP); Ryosuke Saito, Koganei (JP)

(73) Assignee: Kabushiki Kaisha Toshiba, Tokyo (JP)

(*) Notice: Subject to any disclaimer, the term of this patent is extended or adjusted under 35 U.S.C. 154(b) by 231 days.

(21) Appl. No.: 13/239,283

(22) Filed: Sep. 21, 2011

(65) Prior Publication Data

US 2012/0140409 A1 Jun. 7, 2012

(30) Foreign Application Priority Data

Dec. 3, 2010 (JP) ................................. 2010-270707

(51) Int. Cl.
*G06F 1/16* (2006.01)
*G06F 3/033* (2013.01)

(52) U.S. Cl.
USPC ............ 361/679.09; 361/679.55; 361/679.56; 345/179

(58) Field of Classification Search
USPC ............. 361/679.01–679.45, 679.55–679.59; 345/179
See application file for complete search history.

(56) References Cited

U.S. PATENT DOCUMENTS

| | | | | |
|---|---|---|---|---|
| 5,666,261 A | * | 9/1997 | Aguilera | 361/679.09 |
| 5,757,681 A | * | 5/1998 | Suzuki et al. | 708/107 |
| 5,796,575 A | * | 8/1998 | Podwalny et al. | 361/679.27 |
| 6,819,557 B2 | * | 11/2004 | Lilenfeld | 361/679.56 |
| 8,081,172 B2 | * | 12/2011 | Chikazawa et al. | 345/179 |
| 8,081,479 B2 | * | 12/2011 | Tanaka | 361/730 |
| 2004/0246669 A1 | * | 12/2004 | Minaguchi et al. | 361/683 |

FOREIGN PATENT DOCUMENTS

| | | | |
|---|---|---|---|
| JP | 10-207611 A | | 8/1998 |
| JP | 11-238105 A | | 8/1999 |
| JP | 2001-236327 A | | 8/2001 |
| JP | 2001236327 A | * | 8/2001 |
| JP | 2002-312061 A | | 10/2002 |
| JP | 2002312061 A | * | 10/2002 |
| JP | 2005-208728 A | | 8/2005 |
| JP | 2010-067193 A | | 3/2010 |
| JP | 2010-146199 A | | 7/2010 |
| JP | 2010146199 A | * | 7/2010 |
| WO | WO 2007086106 A1 | | 8/2007 |

OTHER PUBLICATIONS

First Office Action mailed Nov. 22, 2011, in corresponding Japanese Patent Application No. 2010-270707 in 5 pages.

* cited by examiner

*Primary Examiner* — Jayprakash N Gandh
*Assistant Examiner* — Nidhi Desai
(74) *Attorney, Agent, or Firm* — Knobbe Martens Olson & Bear LLP

(57) ABSTRACT

According to one embodiment, an electronic apparatus includes a housing and a stylus holder accommodated in the housing. The stylus holder includes a holding portion that is supported in the housing and configured to ejectably hold a stylus for handwriting input and a reinforcing wall that is provided to the holding portion and configured to reinforce the housing from the inside of the housing.

11 Claims, 10 Drawing Sheets

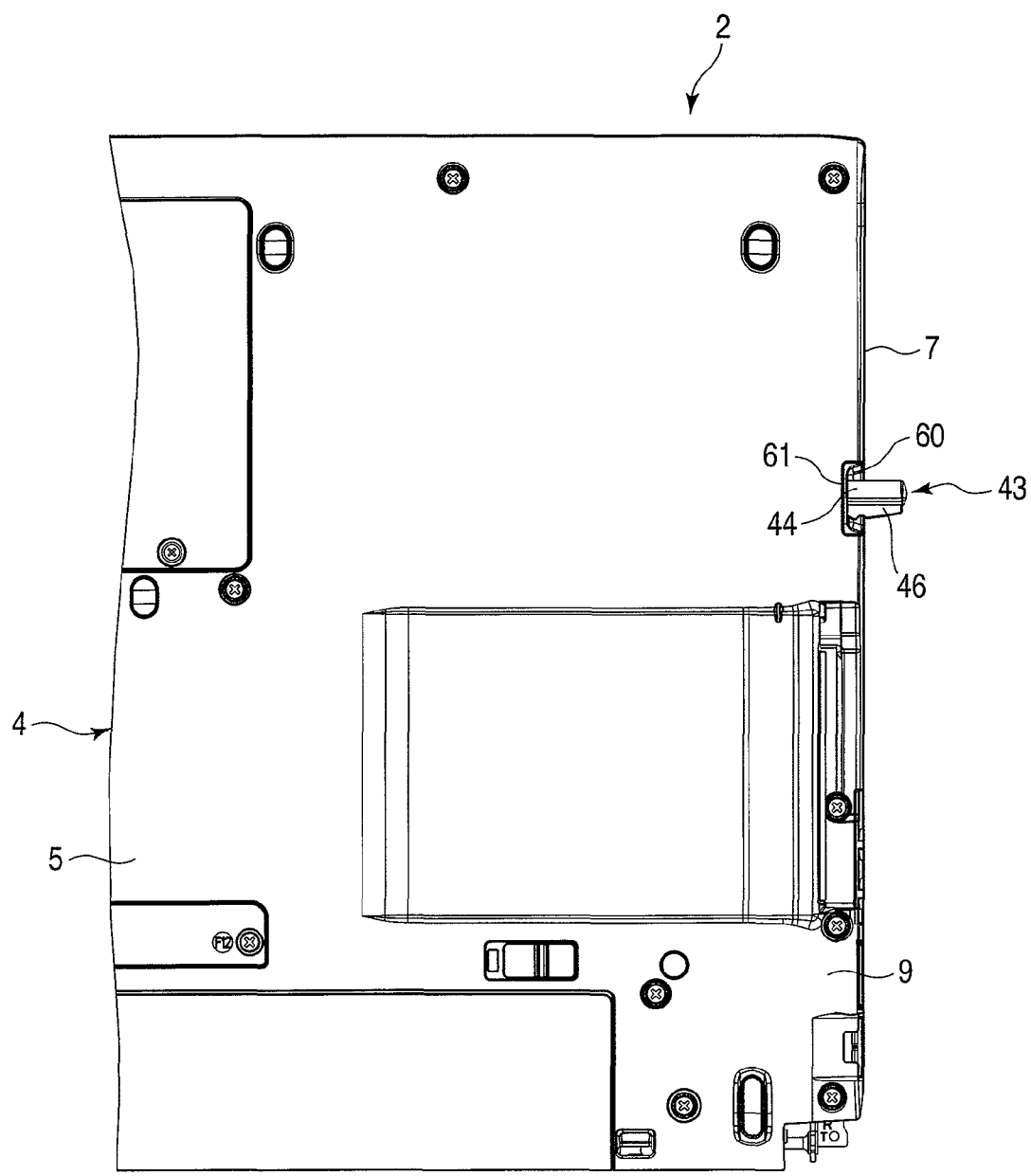
F I G. 3

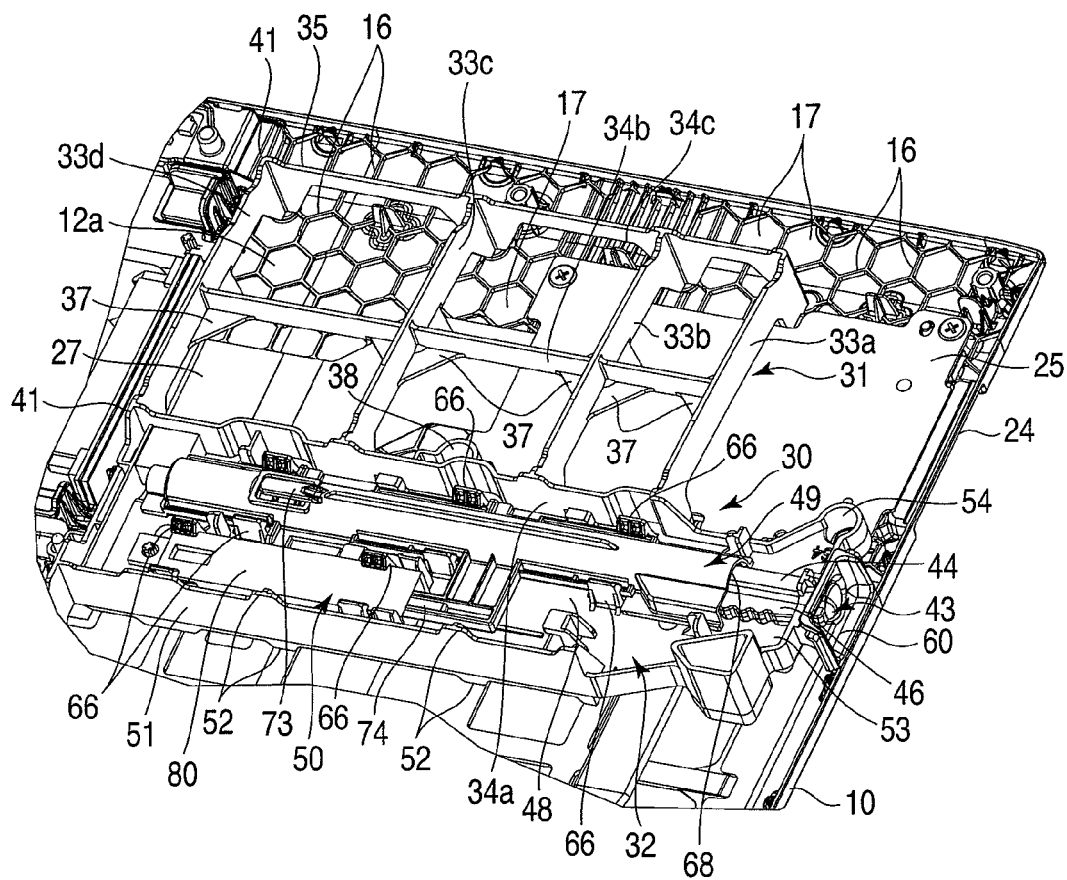
F I G. 5

ELECTRONIC APPARATUS

CROSS-REFERENCE TO RELATED APPLICATIONS

This application is based upon and claims the benefit of priority from Japanese Patent Application No. 2010-270707, filed Dec. 3, 2010; the entire contents of which are incorporated herein by reference.

FIELD

Embodiments described herein relate generally to an electronic apparatus equipped with a stylus holder configured to hold a stylus for handwriting input.

BACKGROUND

For example, an electronic apparatus having a handwritten character recognition function includes a stylus receptacle configured to ejectably accommodate a stylus in a housing. The stylus receptacle is tunnel-like hollow space and extends in an axial direction of the stylus in the housing.

In a state that the stylus is extracted from the stylus receptacle, the stylus receptacle is just the hollow space and remains in the housing. Therefore, the rigidity of the housing is hard to be assured.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary plan view showing the first housing of the portable computer from a direction of a bottom;

FIG. 5 is an exemplary perspective view showing a state that the dummy unit is fixed to the top cover of the first housing;

DETAILED DESCRIPTION

Various embodiments will be described hereinafter with reference to the accompanying drawings. In general, according to one embodiment, an electronic apparatus includes a housing and a stylus holder accommodated in the housing. The stylus holder includes a holding portion that is supported in the housing and configured to ejectably hold a stylus for handwriting input and a reinforcing wall that is provided to the holding portion and configured to reinforce the housing from the inside of the housing.

The following embodiment will now be described hereinafter with reference to the drawings.

Figure 1:
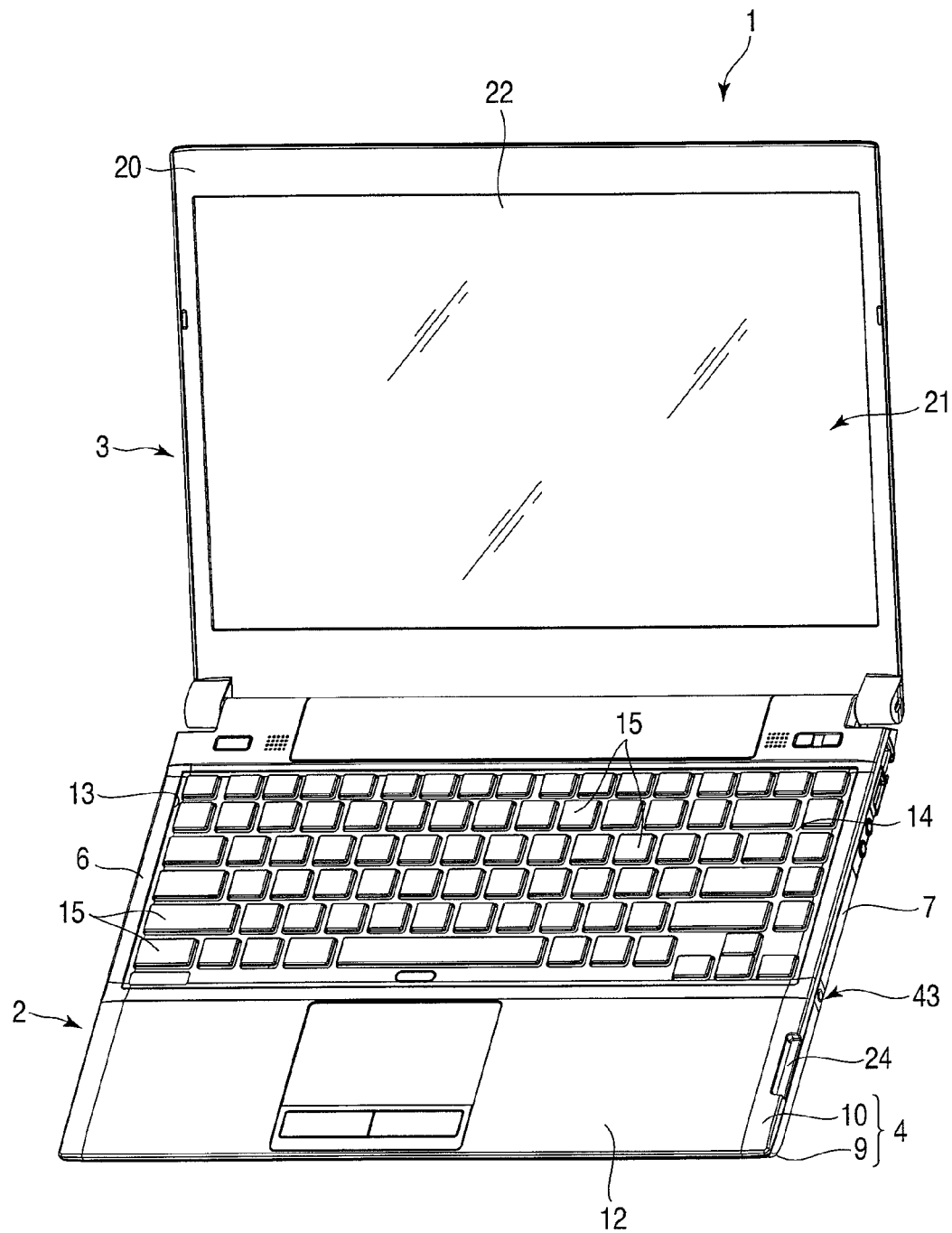
FIG. 1 is an exemplary perspective view of a portable computer according to an embodiment.

FIG. 1 shows a portable computer 1 which is an example of an electronic apparatus. The portable computer 1 comprises a main module 2 and a display module 3. The main module 2 includes a first housing 4. The first housing 4 has a flat box shape and has a bottom wall 5, an upper wall 6, and left and right sidewalls 7 (a right sidewall alone is shown).

The bottom wall 5 is an example of a first wall, and it faces an upper face of a desk when the portable computer 1 is placed on the desk, for example. The bottom wall 5 has a front end portion 5a curved into a circular shape toward the upper side of the first housing 4. The upper wall 6 is an example of a second wall and faces the bottom wall 5. A front edge of the upper wall 6 abuts on an upper edge of the front end portion 5a of the bottom wall 5. The sidewall 7 is an example of a third wall. The sidewall 7 is erected from the bottom wail 5 to extend between a side edge of the bottom wall 5 and a side edge of the upper wall 6.

Figure 2:
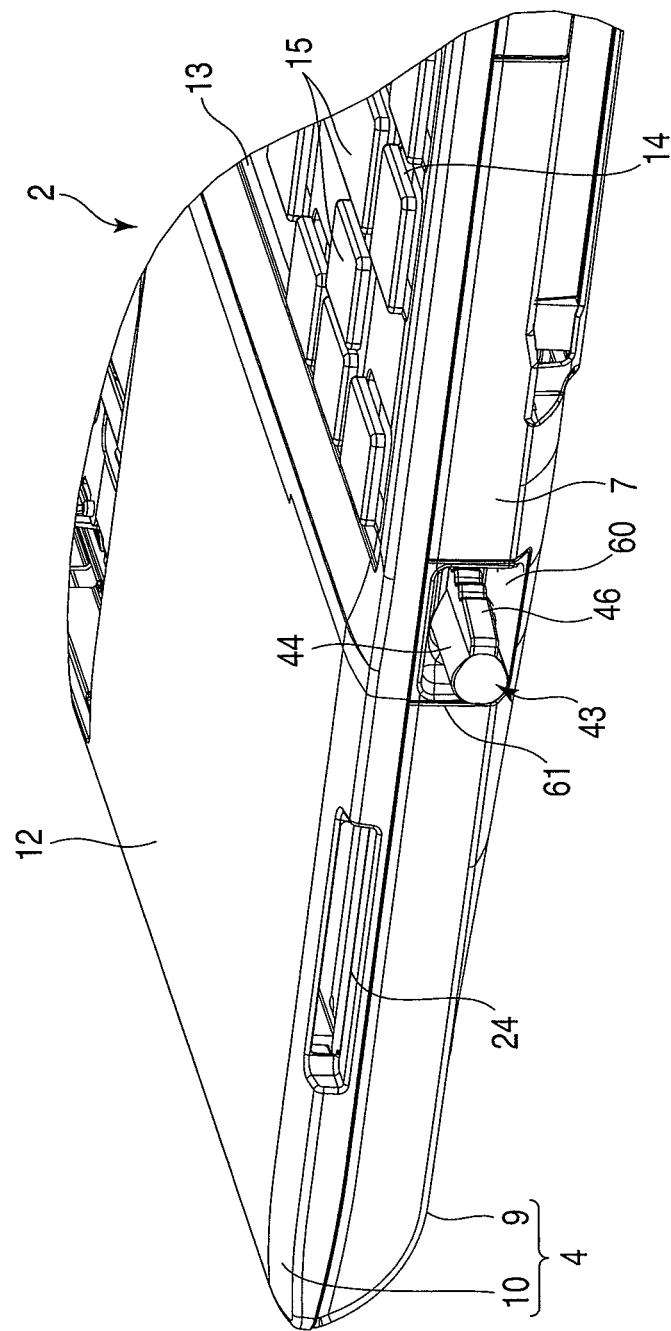
FIG. 2 is an exemplary perspective view showing a state that the stylus for handwriting input is inserted in a stylus insertion opening of a first housing.
Figure 6:
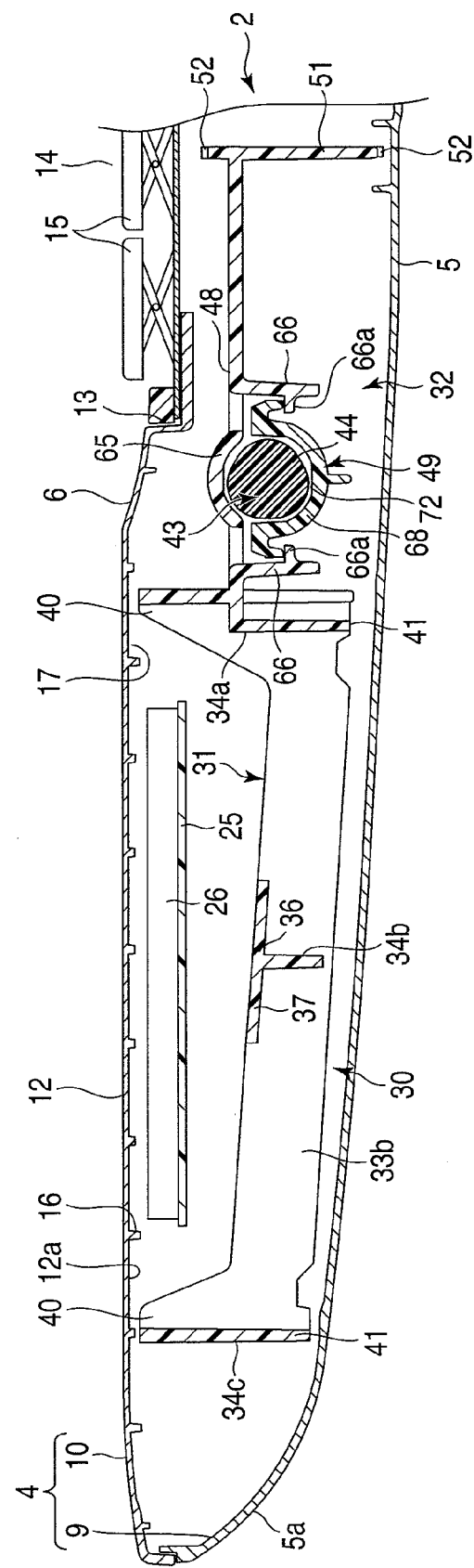
FIG. 6 is an exemplary cross-sectional view of a main module.

As shown in FIG. 2 and FIG. 6, the first housing 4 includes a base 9 and a top cover 10. The base 9 includes the bottom wall 5 and the sidewalls 7. The top cover 10 includes the upper wall 6. The first housing 4 is assembled by covering the upper side of the base 9 with the top cover 10.

As shown in FIG. 1, FIG. 2, and FIG. 6, the upper wall 6 of the first housing 4 includes a palm rest 12 and a keyboard mounting portion 13. The palm rest 12 extends in a width direction of the first housing 4 in a front half portion of the upper wall 6. The keyboard mounting portion 13 is formed of a square indentation which is deeper than the palm rest 12. The keyboard mounting portion 13 is placed at the rear of the palm rest 12.

A keyboard 14 is installed on the keyboard mounting portion 13. The keyboard 14 has a plurality of key tops 15. An upper surface of each key top 15 is placed on substantially the same plane as the upper surface of the palm rest 12 and exposed to the outside of the first housing 4.

Figure 4:
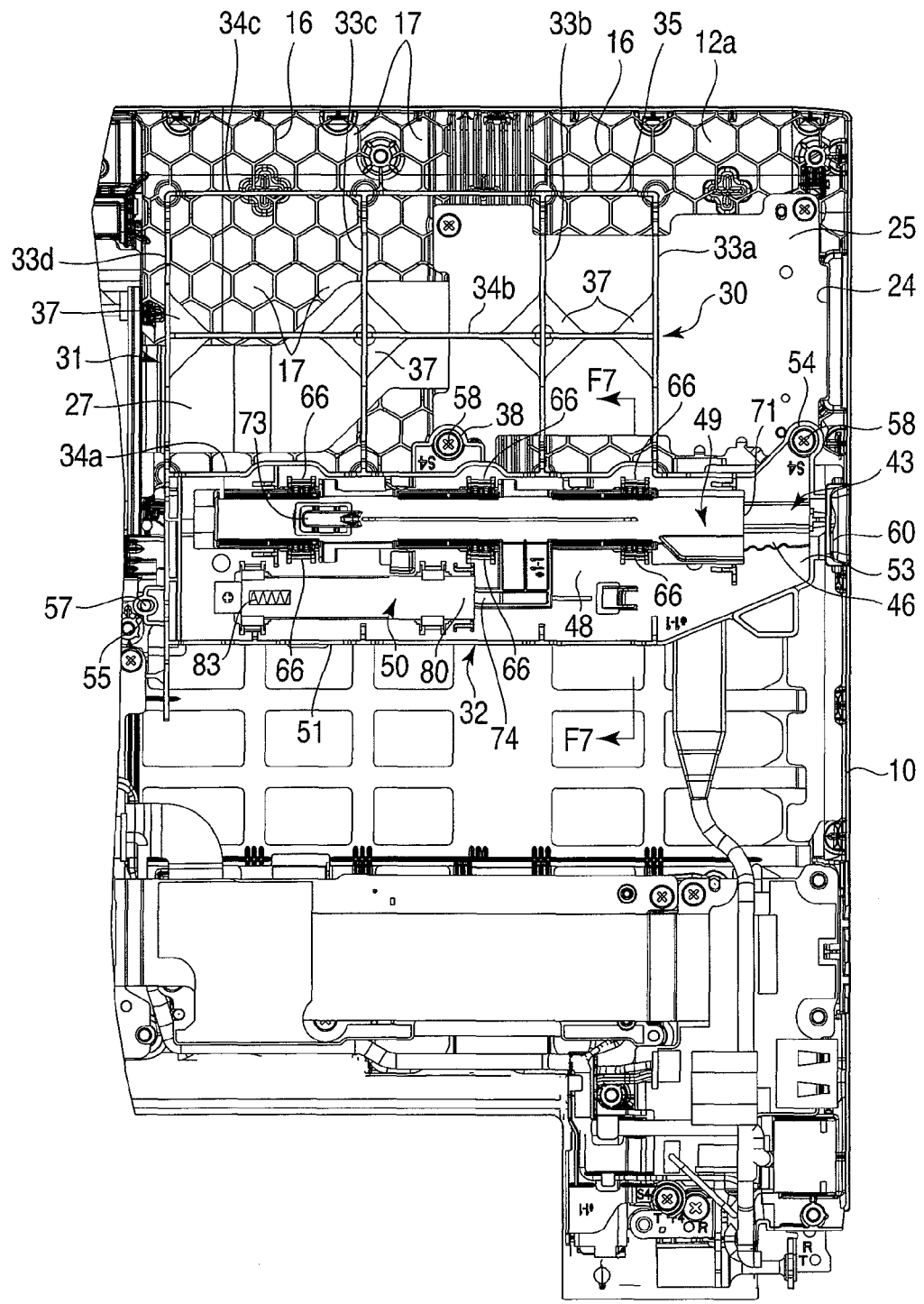
FIG. 4 is an exemplary plan view showing a state that a dummy unit is fixed to a top cover of the first housing.

As shown in FIG. 4 to FIG. 6, the palm rest 12 has an inner surface 12a exposed to the inside of the first housing 4. A plurality of honeycomb-like ribs 16 are integrally formed on the inner surface 12a of the palm rest 12. The rib 16 is an element which is configured to reinforce the palm rest 12 from the inside of the first housing 4 and slightly downwardly protrudes from the inner surface 12a of the palm rest 12. The ribs 16 define a plurality of hexagonal regions 17 on the inner surface 12a of the palm rest 12. The regions 17 extend over the entire area of the inner surface 12a of the palm rest 12 and are adjacent to each other.

As shown in FIG. 1, the display module 3 includes a second housing 20 and a liquid crystal display device 21 accommodated in the second housing 20. The second housing 20 has a flat box shape that is substantially the same as the first housing 4 in size. The liquid crystal display device 21 has a transparent touch panel 22 through which information is input. The touch panel 22 is laminated on the liquid crystal display panel and exposed to the outside of the second housing 20 from a front surface of the second housing 20.

The display module 3 is supported at a rear end portion of the first housing 4. The display module 3 can pivotally move between a closed position and an open position. At the closed position, the display module 3 lies down on the first housing 4 to cover the palm rest 12 and the keyboard 14. At the open position, the display module 3 rises from the rear end portion of the first housing 4 to expose the palm rest 12, the keyboard 14, and the touch panel 22.

As shown in FIG. 1 and FIG. 2, the first housing 4 includes a card slot 24 through which, e.g., an SD memory card can be inserted or removed. The card slot 24 is opened at a corner portion defined by a right end portion of the palm rest 12 and an upper portion of the sidewall 7.

As shown in FIG. 4 to FIG. 6, a rigid printed circuit board 25 is fixed at a right end portion of the inner surface 12a of the palm rest 12 through screws. A card holder 26 is implemented on the printed circuit board 25. The card holder 26 is configured to hold the SD memory card inserted from the card slot 24. The card holder 26 has terminals to which the SD memory card is electrically connected. The card holder 26 is arranged in a gap between the printed circuit board 25 and the inner surface 12a of the palm rest 12 and adjacent to the card slot 24.

A flexible printed wiring board 27 is connected to the printed circuit board 25. The flexible printed wiring board 27 is pulled out from the printed circuit board 25 along the inner surface 12a of the palm rest 21. The flexible printed wiring board 27 is electrically connected to a mother board accommodated in the first housing 14.

As the portable computer 1 according to the embodiment, a premium model having an optical disk drive device mounted in the first housing 4 and a basic model in which the optical disk drive device is omitted are prepared. The portable computer 1 shown in FIG. 1 is a basic model. In the basic model, a synthetic resin dummy unit 30 is detachably accommodated in a mounting space in the first housing 4 in place of an optical disk device.

Figure 8:
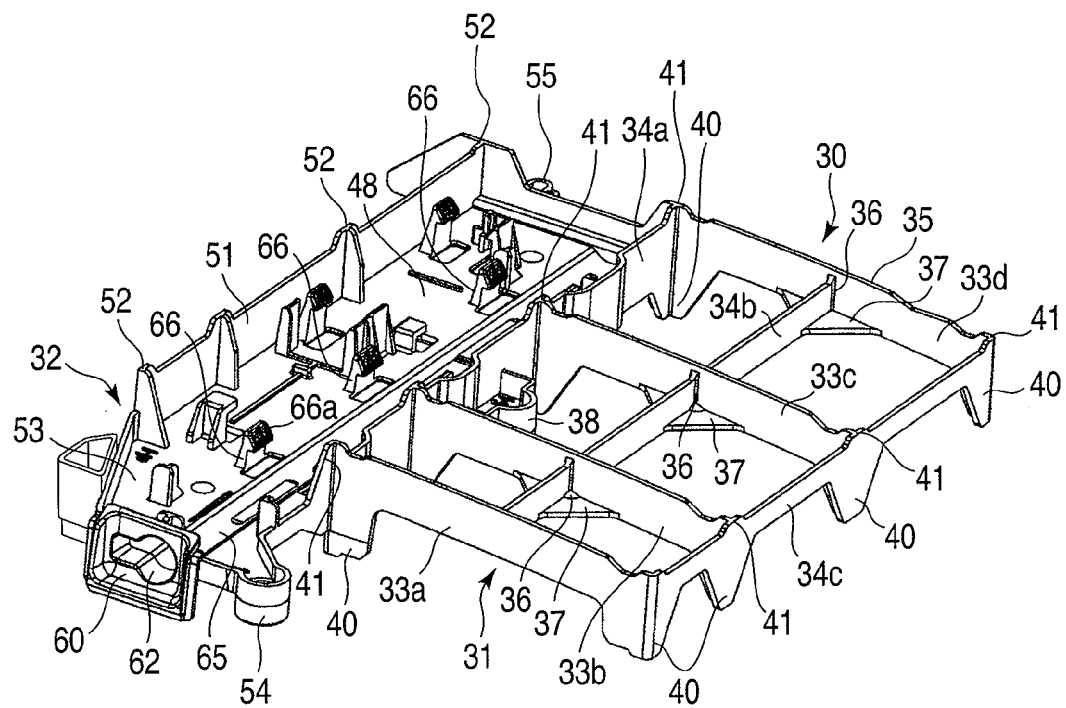
FIG. 8 is an exemplary perspective view of the dummy unit.

As shown in FIG. 4, FIG. 5, and FIG. 8, the dummy unit 30 includes a frame structure 31 and a stylus holder 32. The frame structure 31 has a size corresponding to the optical disk drive. The frame structure 31 includes first to fourth vertical crosspieces 33a, 33b, 33c, and 33d and first to third horizontal crosspieces 34a, 34b, and 34c.

Each of the first to fourth vertical crosspieces 33a, 33b, 33c, and 33d is an example of a first frame element. The first to fourth vertical crosspieces 33a, 33b, 33c, and 33d extend in a depth direction of the first housing 4 and are arranged parallel to each other at intervals along a width direction of the first housing 4.

Each of the first to third horizontal crosspieces 34a, 34b, and 34c is an example of a second frame element. The first to third horizontal crosspieces 34a, 34b, and 34c extend in the width direction of the first housing 4 and are arranged parallel to each other at intervals along the depth direction of the first housing 4.

Therefore, the first to fourth crosspieces 33a, 33b, 33c, and 33d and the first to third horizontal crosspieces 34a, 34b, and 34c are combined in a reticular pattern to be orthogonal to each other.

According to this embodiment, the first vertical crosspiece 33a, the fourth vertical crosspiece 33d, the first horizontal crosspiece 34a, and the third horizontal crosspiece 34c constitute a square outer frame 35 in cooperation with each other. The outer frame 35 forms an outer shape of the frame structure 31.

The frame structure 31 has four intersecting portions 36 at which the second horizontal crosspiece 34b crosses the first to fourth vertical crosspieces 33a, 33b, 33c, and 33d. The intersecting portions 36 are aligned in line along the width direction of the first housing 4.

Each intersecting portion 36 of the frame structure 31 is reinforced by a reinforcing plate 37. The reinforcing plate 37 extend between an upper edge of the second horizontal crosspiece 34b and an upper edge of the first vertical crosspiece 33a, between the upper edge of the second horizontal crosspiece 34b and an upper edge of the second vertical crosspiece 33b, between the upper edge of the second horizontal crosspiece 34b and an upper edge of the third vertical crosspiece 33c, and between the upper edge of the second horizontal crosspiece 34b and an upper edge of the fourth vertical crosspiece 33d.

A boss portion 38 is integrally formed in the first horizontal crosspiece 34a. The boss portion 38 protrudes from an intermediate portion of the first horizontal crosspiece 34a along a longitudinal direction toward the second horizontal crosspiece 34b to face the inner surface 12a of the palm rest 12.

As shown in FIG. 5, FIG. 6, and FIG. 8, the frame structure 31 has a plurality of first protrusions 40 and a plurality of second protrusions 41. The first protrusions 40 protrude from the first horizontal crosspiece 34a, the third horizontal crosspiece 34c, and the first to fourth vertical crosspieces 33a to 33d toward the inner surface 12a of the palm rest 12. The first protrusions 40 are aligned at intervals in the longitudinal direction of the first to third horizontal crosspieces 34a and 34c and apart from each other in the longitudinal direction of the first to fourth vertical crosspieces 33a to 33d.

The second protrusions 41 protrude from the first horizontal crosspiece 34a and the third horizontal crosspiece 34c toward the inner surface of the bottom wall 5 of the first housing 4. The second protrusions 41 are aligned at intervals in the longitudinal direction of the first crosspiece 34a and the third crosspiece 34c.

The stylus holder 32 of the dummy unit 30 is an element configured to ejectably hold a synthetic resin stylus 43. The stylus 43 is an example of an operation pen that executes an input operation by pressing the touch panel 22.

Figure 11:
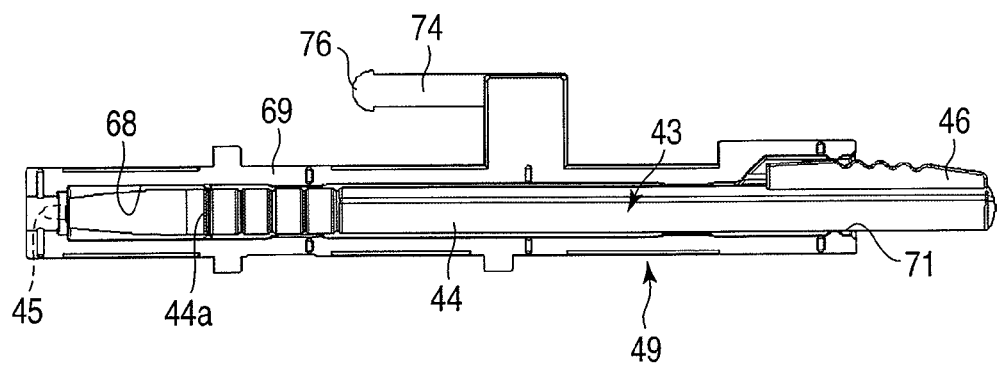
FIG. 11 is an exemplary plan view showing a state that the stylus is inserted in the slider.

As shown in FIG. 11, the stylus 43 includes a cylindrical stylus shaft 44, a stylus tip 45, and a protruding portion 46. The stylus tip 45 has a diameter smaller than that of the stylus shaft 44 and protrudes from an end of the stylus shaft 44. The protruding portion 46 is placed on the opposite side of the stylus tip 45. The protruding portion 46 protrudes into a fin-like shape from an outer peripheral surface of the stylus shaft 44 to extend in an axial direction of the stylus shaft 44. Furthermore, an engagement groove 44a is formed in the outer peripheral surface of the stylus shaft 44. The engagement groove 44a is continuous in a circumferential direction of the stylus shaft 44 and placed at an end portion of the stylus shaft 44 close to the stylus tip 45.

Figure 7:
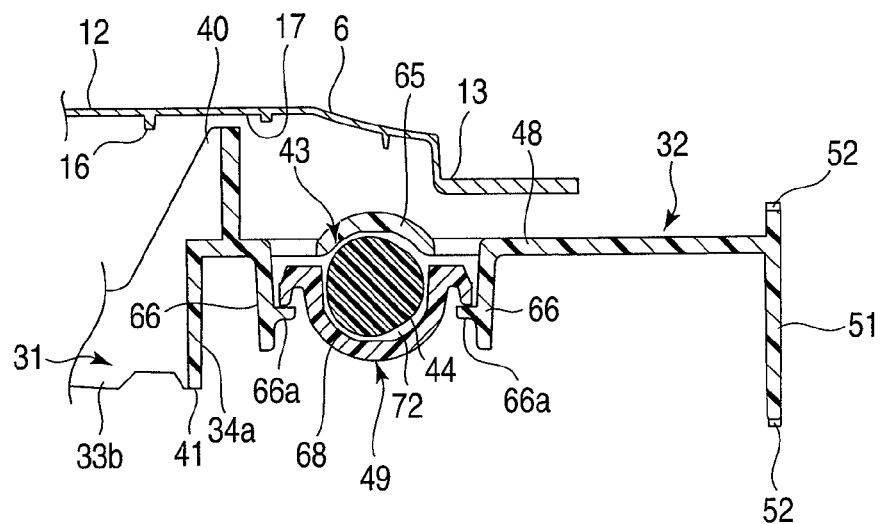
FIG. 7 is an exemplary cross-sectional view along a line F7-F7 in FIG. 4.

As shown in FIG. 6 to FIG. 8, the stylus holder 32 is integrated with the frame structure 31. The stylus holder 32 includes a holding portion 48, a slider 49, and a catch mechanism 50.

The holding portion 48 is integrally formed in the first horizontal crosspiece 34a of the frame structure 31. The holding portion 48 has an elongated plate-like shape extending in the width direction of the first housing 4 and protrudes around the frame structure 31. The holding portion 48 has a reinforcing wall 51. The reinforcing wall 51 is erected from a peripheral edge of the holding portion 48 toward the bottom wall 5 of the first housing 4 and surrounds the holding portion 48 in cooperation with the first horizontal crosspiece 34a. A plurality of third protrusions 52 are formed on an upper edge and a lower edge of the reinforcing wall 51, respectively. The third protrusions 52 are aligned at intervals.

The holding portion 48 has an extending portion 53. The extending portion 53 protrudes at the periphery of the frame structure 31 beyond the first vertical crosspiece portion 33a of the frame structure 31. A boss portion 54 is integrally formed with respect to the extending portion 53. The boss portion 54 protrudes from the extending portion 53 to face the inner surface 12a of the palm rest 12.

Figure 12:
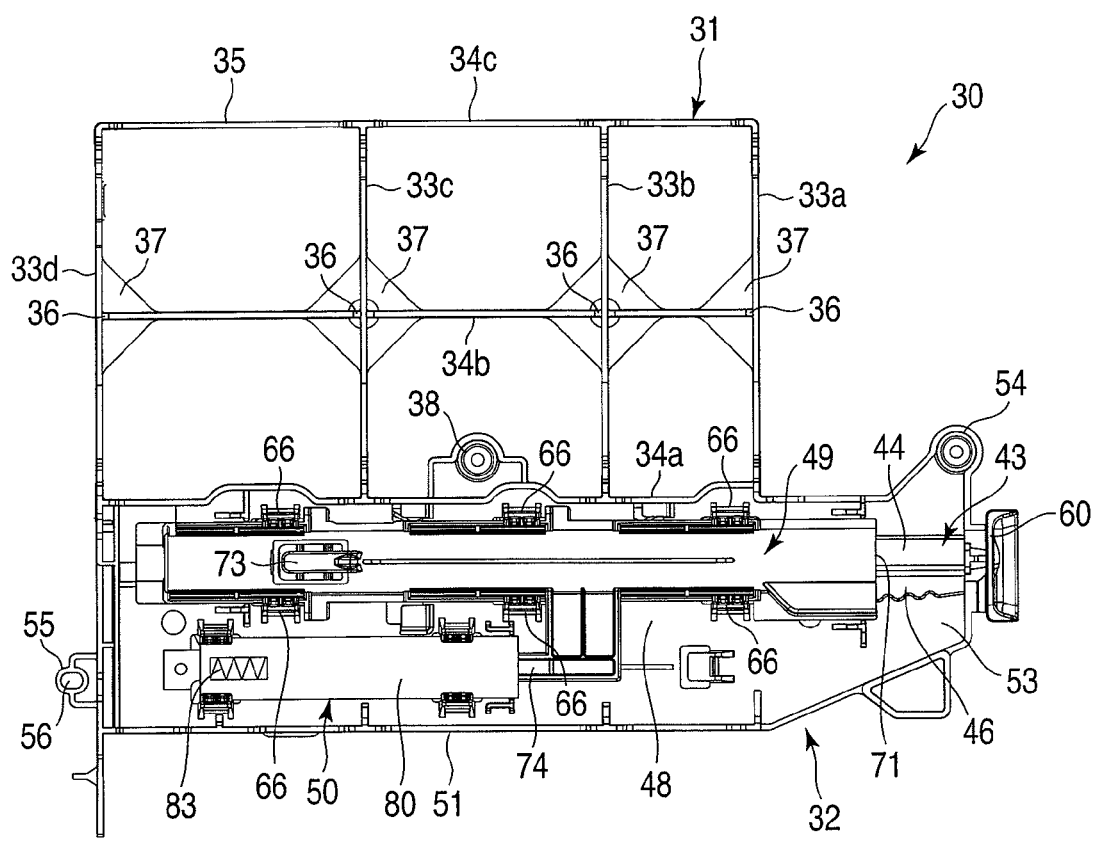
FIG. 12 is an exemplary plan view showing a state that the slider is slid to a first position together with the stylus.
Figure 13:
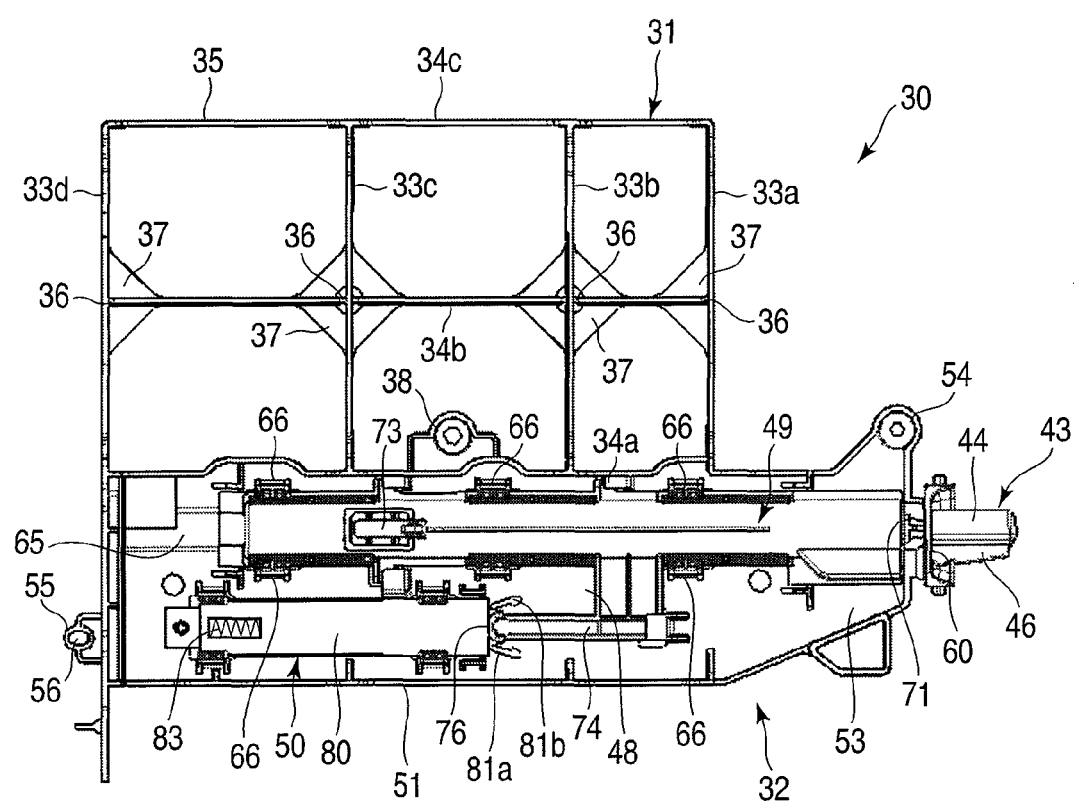
FIG. 13 is an exemplary plan view showing a state that the slider is slid to a second position together with the stylus.

A such a positioning portion 55 as shown in FIG. 12 and FIG. 13 is integrally formed on the holding portion 48. The positioning portion 55 is placed on the opposite side of the extending portion 53 and has an engagement hole 56 having a long hole shape.

As shown in FIG. 4 and FIG. 5, a convex portion 57 protruding from the inner surface 12a of the palm rest 12 is fitted in the engagement hole 56 of the positioning portion 55. This fitting enables rough positioning of the dummy unit 30 with respect to the palm rest 12. Furthermore, the boss portion 38 of the frame structure 31 and the boss portion 54 of the stylus holder 32 are fixed to the inner surface 12a of the palm rest 12 through screws 58, respectively.

Therefore, as shown in FIG. 6, the dummy unit 30 is suspended from the inner surface 12 at the right end portion of the palm rest 12 and accommodated in the implementation space in the first housing 4 in this state. The frame structure 31 of the dummy unit 30 is interposed between the bottom wall 5 of the first housing 4 and the palm rest 12 and configured to reinforce the first housing 4 from the inside.

More specifically, ends of the first protrusions 40 of the frame structure 31 abut on the inner surface 12a of the palm rest 12 at positions associated with regions 17 surrounded by the ribs 16, or they face the inner surface 12a of the palm rest 12 to interpose a small gap of, e.g., an approximately 1 mm. Likewise, ends of the second protrusions 41 of the frame structure 31 abut on the inner surface of the bottom wall 5 of the first housing 4, or they face the inner surface of the bottom wall 5 to interpose a small gap of, e.g., approximately 1 mm.

Therefore, when external force that presses the right end portion of the palm rest 12 from above is applied to the first housing 4, the frame structure 31 supports the palm rest 12 from below to avoid deformation of the palm rest 12.

Moreover, in this embodiment, as shown in FIG. 5 and FIG. 6, the printed circuit board 25 having the card holder 26 is accommodated in a gap between the second crosspiece 34b and the first and second crosspieces 33a and 33b of the frame structure 31 and the inner surface 12a of the palm rest 12. The flexible printed wiring board 27 connected to the printed circuit board 25 is wired through the gap between the frame structure 31 and the inner surface 12a of the palm rest 12.

At this time, as shown in FIG. 5 and FIG. 6, the first protrusions 40 of the frame structure 31 support the palm rest 12 from below around the printed circuit board 25. Therefore, even if the right end portion of the palm rest 12 is pressed from above, the palm rest 12 is barely deformed to cause dishing. Therefore, the interference of the palm rest 12 and the card holder 26 can be avoided.

In a state that the dummy unit 30 is fixed to the inner surface 12a of the palm rest 12, the holding portion 48 of the stylus holder 32 is placed in a region extending from a rear part of the right end portion of the palm rest 12 to the lower side of the keyboard mounting portion 13. The holding portion 48 extends along the width direction of the first housing 4 from the right sidewall 7 of the first housing 4. The reinforcing wall 51 of the holding portion 32 is interposed between the keyboard mounting portion 13 and the bottom wall 5 of the first housing 4 to reinforce the first housing 4 from the inside.

That is, as shown in FIG. 6, ends of the third protrusions 52 of the reinforcing wall 51 abut on the inner surface of the keyboard mounting portion 13 and the inner surface of the bottom wall 5, or they face the inner surface of the keyboard mounting portion 13 and the inner surface of the bottom wall 5 to interpose a small gap of, e.g., approximately 1 mm.

Therefore, when external force that presses the keyboard 14 from above is applied to the first housing 4, the reinforcing wall 51 of the stylus holder 32 supports the keyboard mounting portion 13 from below to avoid deformation of the first housing 4.

As shown in FIG. 5 and FIG. 8, the extending portion 53 of the holding portion 48 includes an end wall 60. The end wall 60 is fitted in an opening portion 61 formed in the right sidewall 7 of the first housing 4. In other words, the end wall 60 is exposed to the outside of the first housing 4 from the opening portion 61 to function as one of appearance elements forming the first housing 4. A stylus insertion opening 62 through which the stylus 43 is inserted or extracted is formed in the end wall 60. The stylus insertion opening 62 is opened in the implementation space in the first housing 4.

As shown in FIG. 6 and FIG. 7, the holding portion 48 has a circularly curved recessed portion 65. The recessed portion 65 is configured to receive the stylus shaft 44 of the stylus 43 and linearly extends in the longitudinal direction of the holding portion 48. One end of the recessed portion 65 is continuous with the stylus insertion opening 62 through the extending portion 53.

A plurality of support pieces 66 are integrally formed on the holding portion 48. Each support piece 66 protrudes from the holding portion 48 and has a claw 66a at a protruding end thereof. The support pieces 66 are aligned in the longitudinal direction at intervals and face each other to interpose the recessed portion 65.

Figure 9:
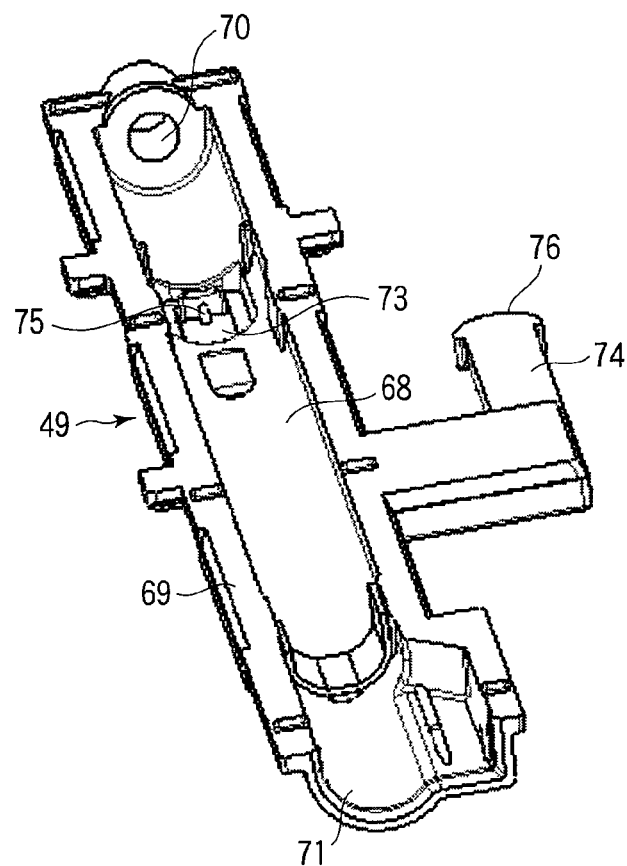
FIG. 9 is an exemplary perspective view of a slider supported by a holding portion of a stylus holder.
Figure 10:
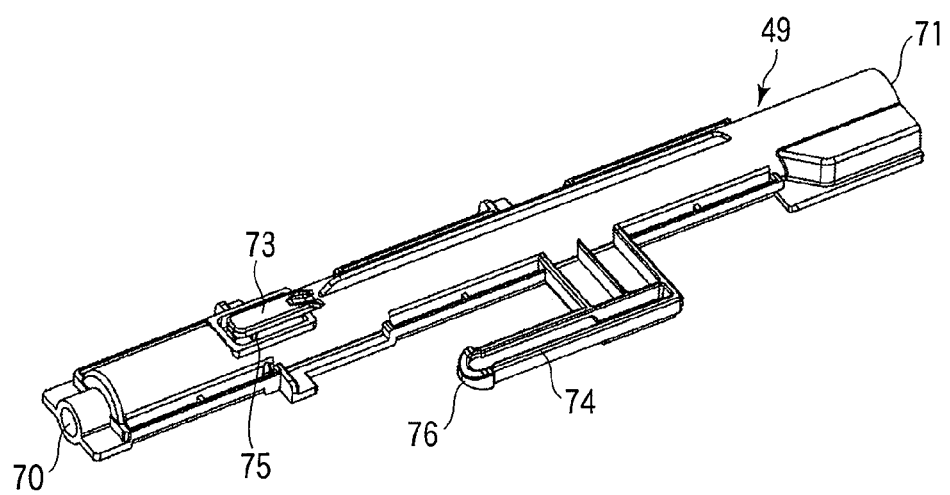
FIG. 10 is an exemplary perspective view of the slider seen from an opposite side of FIG. 9.

The slider 49 is formed of, e.g., a synthetic resin material. As shown in FIG. 9 and FIG. 10, the slider 49 has a semi-cylindrical shape extending in the axial direction of the stylus 43. Specifically, the slider 49 includes a concave portion 68 that the stylus 43 enters, a slide guide surface 69 that surrounds an opening end of the concave portion 68, a fitting hole 70 in which the stylus tip 45 of the stylus 43 is ejectably fitted, and a stylus insertion portion 71 opened toward the opposite side of the fitting hole 70.

The slider 49 is fitted between the support pieces 66 in a posture that the opening end of the concave portion 68 faces the recessed portion 65. As a result, as shown in FIG. 6 and FIG. 7, the claws 66a of the support pieces 66 are slidably caught on an open edge portion of the slider 49 from the opposite side of the recessed portion 65. Therefore, the slider 49 is slidably sandwiched and held between the claws 66a of the support pieces 66 and the lower surface of the holding portion 48. The slide guide surface 69 of the slider 49 faces the lower surface of the holding portion 48.

As a result, the slider 49 is held by the holding portion 48 to be slidable in the width direction of the first housing 4, and the concave portion 68 of the slider 49 faces the recessed portion 65 of the holding portion 48. The concave portion 68 and the recessed portion 65 define a tunnel-like stylus receptacle 72 in corporation with each other. The stylus receptacle 72 is continuous with the stylus insertion opening 62.

As shown in FIG. 9 and FIG. 10, the slider 49 includes an engagement piece 73 and an arm portion 74. The engagement piece 73 is integrally formed at a position deviated toward the fitting hole 70 from an intermediate portion of the slider 49 along the longitudinal direction. The engagement piece 73 has an engagement protrusion 75 protruding in the concave portion 68. The engagement piece 73 can be elastically deformed in a direction along which the engagement protrusion 75 recedes to the outside of the concave portion 68.

The arm portion 74 diverges from the intermediate portion of the slider 49 along the longitudinal direction and extends toward the fitting hole 70 of the slider 49 parallel to the slider 49. An end of the arm portion 74 is formed into an arrowhead fitting portion 76 expanded to be larger than the arm portion 74.

The stylus 43 is inserted into the stylus receptacle 72 from the stylus insertion opening 62 of the first housing 4 through the stylus insertion portion 71 of the slider 49. When the engagement groove 44a of the stylus shaft 44 reaches the position of the engagement protrusion 75 of the slider 49 with the insertion of the stylus 43, the engagement protrusion 75 is elastically caught in the engagement groove 44a. As a result, the stylus 43 is integrally coupled with the slider 49, and the slider 49 slides together with the stylus 43.

More specifically, FIG. 11 shows a state that the engagement protrusion 75 of the slider 49 is caught in the engagement groove 44a of the stylus shaft 44. As shown in FIG. 11, when the stylus 43 is integrally coupled with the slider 49, the stylus tip 45 enters the fitting hole 70 of the slider 49, and the end portion of the stylus shaft 44 having the protruding portion 46 projects from the stylus insertion portion 71 of the slider 49.

In this embodiment, the slider 49 can slide between a first position and a second position together with the stylus 43. FIG. 12 shows a state that the slider 49 is slid to the first position. At the first position, the stylus insertion portion 71 of the slider 49 is apart from the stylus insertion opening 62, and the end portion of the stylus shaft 44 having the protruding portion 46 is placed between the stylus insertion portion 71 and the stylus insertion opening 62. Therefore, the stylus 43 is accommodated in the first housing 4, and the end portion of the stylus shaft 44 is accommodated in the opening end of the stylus insertion opening 62 without protruding to the outside of the first housing 4.

FIG. 13 shows a state that the slider 49 is slid to the second position. At the second position, the stylus insertion portion 71 of the slider 49 is placed immediately before the end wall 60 of the holding portion 48, and the end portion of the stylus shaft 44 having the protruding portion 46 projects to the outside of the first housing 4 from the stylus insertion opening 62. FIG. 2 and FIG. 3 show a state that the end portion of the stylus shaft 44 projects to the outside of the first housing 4 from the stylus insertion opening 62.

The catch mechanism 50 is an example of a locking mechanism that locks the slider 49 at the first position or unlocks the slider 49. The catch mechanism 50 includes a case 80 and a pair of holding claws 81a and 81b supported by the case 80.

The case 80 has an elongated box shape extending in a sliding direction of the slider 49, and it is fixed to the lower surface of the holding portion 48 to be adjacent to the slider 49. The arm portion 74 of the slider 49 is configured to be inserted into the case 80 from one end of the case 80 along the longitudinal direction. As shown in FIG. 13, in a state that the slider 49 is slid to the second position, the arm portion 74 is pulled to the outside of the case 80, and the fitting portion 76 at the end of the arm portion 74 faces one end of the case 80.

When the slider 49 is slid to the second position, the holding claws 81a and 81b are pushed by a spring 83 to project from one end of the case 80 to the outside of the case 80. The fitting portion 76 at the end of the arm portion 74 is interposed between the holding claws 81a and 81b.

When the slider 49 is slid toward the first position from the second position, the holding claws 81a and 81b are pushed into the case 80 against the spring 83 by the fitting portion 76 of the slider 49. With this push-in motion, the holding claws 81a and 81b are circularly moved in a direction along which they get closer to each other and thereby hold the fitting portion 76. When the slider 49 reaches the first position, the holding claws 81a and 81b are immovably held in the case 80. Therefore, the slider 49 is locked at the first position.

In the portable computer 1 having such a configuration, in a state that the stylus 43 is extracted to the outside of the first housing 4 from the stylus receptacle 72 of the stylus holder 32, the slider 49 is slid to the second position depicted in FIG. 13.

When the stylus 43 is inserted from the stylus tip 45 into the stylus insertion opening 62 of the first housing 4, the stylus shaft 44 of the stylus 43 is led to the stylus receptacle 72 through the stylus insertion portion 71 of the slider 49. With the insertion of the stylus 43, when the stylus tip 45 enters the fitting hole 70 of the slider 49, the engagement protrusion 75 of the slider 49 is elastically caught in the engagement groove 44a of the stylus shaft 44. As a result, the slider 49 starts to slide toward the first position from the second position in pursuit of the insertion operation of the stylus 43.

When the slider 49 is slid toward the first position from the second position, the arm portion 74 of the slider 49 is pushed into the case 80 of the catch mechanism 50. The holding claws 81a and 81b of the catch mechanism 50 are immovably held in the case 80 while holding the fitting portion 76 of the arm portion 74 therebetween when the slider 49 reaches the first position.

Therefore, the stylus 43 is accommodated in the stylus receptacle 72 in the first housing 4. In a state that the stylus 43 is accommodated in the stylus receptacle 72, the end face of the stylus shaft 44 continues with the protruding portion 46 is held to be exposed in the stylus insertion opening 62. Therefore, pinching the end portion of the stylus shaft 44 with the fingertips to extract the stylus 43 from the stylus recess 72 is impossible, thereby protecting the stylus 43 from theft.

On the other hand, when extracting the stylus 43 from the stylus recess 72, the end face of the stylus shaft 44 exposed from the stylus insertion opening 62 is pushed in by the fingertip. Then, the held state of the holding claws 81a and 81b is released, and the holding claws 81a and 81b are pushed toward one end of the case 80 by the spring 83. Based on this pushing motion, the arm portion 74 is pushed to the outside of the case 80 from the one end of the case 80. Therefore, the slider 49 is slid toward the second position from the first position in pursuit of the arm portion 74.

Further, the holding claws 81a and 81b project to the outside of the case 80 from the one end of the case 80 and circularly move in a direction along which they get apart from each other. As a result, the holding claws 81a and 81b are disengaged from the fitting portion 76 to release the linkage between the slider 49 and the catch mechanism 50.

When the slider 49 reaches the second position, as shown in FIG. 2 and FIG. 3, the end portion of the stylus shaft 44 having the protruding portion 46 projects to the outside of the first housing 4 from the stylus insertion opening 62. Therefore, when the end portion of the stylus shaft 44 is pinched with the fingertips and pulled, the stylus 43 can be extracted from the stylus receptacle 72.

According to such an embodiment, the holding portion 48 of the stylus holder 32 that holds the stylus 43 in cooperation with the slider 49 has the reinforcing wall 51. The reinforcing wall 51 is interposed between the bottom wall 4 of the first housing 4 and the keyboard mounting portion 13 around the holding portion 48 to reinforce the first housing 4 from the inside of the first housing 4.

Therefore, in particular, even if force that pushes, e.g., the keyboard mounting portion 13 or the palm rest 12 from above is applied to the first housing 4 when the stylus 43 is being extracted from the stylus receptacle 72, the reinforcing wall 51 can support the keyboard mounting portion 13 and palm rest 12 from below.

Therefore, the stylus holder 32 can be utilized to assure the rigidity of the first housing 4.

According to this embodiment, the stylus holder 32 is integrated with the frame structure 31 accommodated in the implementation space in the first housing 4 in place of the optical disk device. When external force that pushes the right end portion of the palm rest 12 from above is applied to the first housing 4, the frame structure 31 supports the palm rest 12 from below to avoid deformation of the palm rest 12. Therefore, both the frame structure 31 and the stylus holder 32 can assure the rigidity of the first housing 4.

Additionally, in this embodiment, the stylus holder 32 and the frame structure 31 are integrated with each other as the dummy unit 30. Therefore, the number of components in the portable computer 7 can be decreased to reduce the cost of the portable computer 1.

Further, since the stylus holder 32 is added to the frame structure 31 accommodated in the first housing 4 in place of the optical disk device, the implementation space that accommodates the optical disk device can be substituted by a space that accommodates the stylus 43. Therefore, the first housing 4 can be adopted in both the premium model in which an optical disk drive device is mounted and the basic model in which the optical disk drive device is omitted. As a result, the general versatility of the first housing 4 can be improved, which contributes to a reduction in cost of the portable computer 1.

The liquid crystal display device 21 having a handwriting input function is not restricted to accommodation in the second housing 20 of the display module 3. For example, the display module 3 and the keyboard 14 may be omitted, and the liquid crystal display device 21 may be accommodated in the first housing 4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising: a housing comprising a first wall, a second wall comprising an area on which external force is applied, a third wall extending between an edge of the first wall and an edge of the second wall, a mounting space defined by the first wall, the second wall, and the third wall, and a keyboard provided on the second wall to adjoin the area; a frame in the mounting space of the housing, between the first wall and the second wall, and configured to reinforce the housing from the inside of the housing, wherein the frame is detachable; and a stylus holder in the frame, the stylus holder comprising a holding portion configured to ejectably hold a stylus inserted from a direction of the third wall of the housing in the mounting space at a position deviated from the area of the second wall, the holding portion being projected from the frame in the housing in order to be located immediately below a region of intersection of a rear part of the area of the second wall and the keyboard.

2. The electronic apparatus of claim 1, wherein the stylus holder comprises a reinforcing wall extending from the holding portion, the reinforcing wall between the first wall and the second wall.

3. The electronic apparatus of claim 2, wherein the reinforcing wall surrounds the holding portion in conjunction with the frame.

4. The electronic apparatus of claim 3, wherein the stylus holder comprises:
a stylus insertion opening in the third wall of the housing, configured to receive a stylus;
a slider supported by the holding portion, configured to slide with the stylus received by the stylus insertion opening; and
a locking device configured to lock the slider when the slider slides to a position at which the stylus is accommodated in the housing, and to unlock the slider when the stylus is extracted from the housing.

5. The electronic apparatus of claim 4, wherein the slider is supported by the holding portion and is configured to be slidable between a first position at which the stylus is accommodated in the housing and a second position at which the stylus is projected to the outside of the housing, and the locking device is configured to lock the slider at the first position when the slider in the first position.

6. The electronic apparatus of claim 1, wherein the frame comprises:
a plurality of first frame elements aligned at intervals; and
a plurality of second frame elements aligned at intervals in a direction crossing the first frame elements,
wherein the first frame elements and the second frame elements are arranged in a reticular pattern.

7. The electronic apparatus of claim 6, further comprising a plurality of reinforcing plates extending between the first frame elements and the second frame elements, the reinforcing plates being located at intersections of the first frame elements and the second frame elements.

8. The electronic apparatus of claim 6, wherein:
the second wall of the housing comprises an inner surface comprising honeycomb-like ribs,
the frame comprises a plurality of protrusions protruding toward the inner surface of the second wall, and
ends of the protrusions face regions surrounded by the ribs in the inner surface of the second wall.

9. The electronic apparatus of claim 1, wherein the frame is detachably accommodated in the mounting space in place of a device mounted on the mounting space.

10. An electronic apparatus comprising: a housing comprising a palm rest and a keyboard provided behind the palm rest; a stylus holder in the housing comprising a holding portion configured to ejectably hold a stylus at a position deviated from a central portion of the palm rest; and a frame provided integrally with the stylus holder and configured to reinforce the housing from the inside of the housing under the palm rest, wherein the holding portion of the stylus holder is projected from the frame in order to be located immediately below a region of intersection of a rear part of the palm rest and the keyboard.

11. The electronic apparatus of claim 10, wherein the stylus holder comprises a reinforcing wall extending from the holding portion and configured to reinforce the housing from the inside.

* * * * *